UNITED STATES PATENT OFFICE.

LEWIS E. SAUNDERS, OF NIAGARA FALLS, NEW YORK, ASSIGNOR TO NORTON COMPANY, OF WORCESTER, MASSACHUSETTS, A CORPORATION OF MASSACHUSETTS.

PROCESS OF PURIFYING ALUMINOUS MATERIALS.

1,269,223. Specification of Letters Patent. Patented June 11, 1918.

No Drawing. Application filed August 18, 1917. Serial No. 186,921.

*To all whom it may concern:*

Be it known that I, LEWIS E. SAUNDERS, a citizen of the United States, residing at Niagara Falls, in the county of Niagara and State of New York, have invented certain new and useful Improvements in Processes of Purifying Aluminous Materials, of which the following is a specification.

In my prior United States Patent No. 960,712, patented June 7, 1910, I have described and claimed a process of purifying aluminous materials consisting, in its preferred embodiment, in smelting the impure aluminous material, for example clay or bauxite, with an amount of carbon in excess of that required for the reduction of the oxids of iron, silicon and titanium, which as is well known are normal components of such materials. Under these conditions a material proportion of the alumina is likewise reduced to carbid (or to equivalent reduction products including the hypothetical aluminum suboxid not as yet certainly identified): and it is believed that these reduction products of alumina are the effective reducing agents for the elimination of the last portions of the above mentioned non-aluminous oxids, and more particularly of the difficultly reducible oxid of titanium. The non-aluminous reduced products segregate for the most part from the bath, which then consists of molten alumina and its reduction products, or of the latter alone in case a sufficient proportion of carbon has been used. The aluminous bath is then subjected in a second operating stage to a treatment by oxidation whereby the reduction products of alumina are reconverted into alumina. According to my prior patent, this oxidation was preferably accomplished by means of a gaseous oxidizing agent, as for example by blowing air through the molten bath in the furnace.

The present invention is a specific improvement upon the process of the above-mentioned patent, the improvement consisting in the substitution for air or other gaseous oxidizing agent, of a solid oxygen-containing substance.

The oxidizing addition should be added in sufficient proportion to effect the complete oxidation to alumina of the reduction products of alumina remaining at the close of the first operating stage. As such oxidizing addition I may employ iron oxid, or any of the normal oxid-impurities of bauxite, these being thereby reduced to the corresponding metal or alloy, and for the greater part at least separating out beneath the purified bath. Or I may use oxygen-containing salts or compounds of metals which are volatile under the furnacing conditions, and which are therefore largely eliminated from the charge. Among such compounds I may mention sodium carbonate, zinc oxid and the like.

Instead of using the oxids of iron, silicon or titanium in their naturally occurring forms, or mixtures thereof, I may employ these oxids in the mixture in which they exist in bauxite. In this case I incorporate with the highly reduced product of the first operating stage such a proportion of calcined bauxite that the non-aluminous oxids therein will at least suffice for the re-oxidation of the aluminous reduction products. The mixture is then subjected to electric furnace fusion, yielding directly a commercially pure product containing not only the alumina of the first-stage charge, but also the alumina of the oxidizing addition. It is even desirable in some cases, as when a very tough and strong-grained product is desired, to use the bauxite in decided excess of the amount necessary to re-oxidize the reduction products of alumina. In case this is done the final fused product will of course carry a proportionate amount of the non-aluminous oxids of the bauxite addition.

Or as a further modification, the bauxite or other oxidizing additions may be used in excess in the second operating stage as above described, but in conjunction with such quantity of carbon as may be necessary to reduce the undesired excess of non-aluminous oxids. In this case the carbon should not be used in sufficient proportion to reduce the whole of the excess of non-aluminous oxids in the bauxite, since under such conditions there would be a further formation of reduction products of alumina. These and other modifications of the process may be made without departing from the spirit of my invention. It is one of the operating advantages of this process that great latitude is afforded not merely in the choice of impure raw materials, but in the character and degree of purity of the abrasive products prepared therefrom. For example, I have thus been able to prepare from highly impure raw materials, including clays and silicious bauxites, an aluminous abrasive containing upward of 97 per cent. of alumina.

I claim:—

1. The process of purifying aluminous materials, which consists in fusing the same in presence of a sufficient proportion of carbon to effect a substantial reduction of the alumina, separating the reduced impurities, and then re-oxidizing the reduction products of alumina by electric furnace fusion with a solid oxidizing addition.

2. The process of purifying aluminous materials, which consists in fusing the same in presence of a sufficient proportion of carbon to effect a substantial reduction of the alumina, separating the reduced impurities, and then re-oxidizing the reduction products of alumina by electric furnace fusion with bauxite.

3. The process of purifying aluminous materials, which consists in fusing the same in presence of a sufficient proportion of carbon to effect a substantial reduction of the alumina, separating the reduced impurities, and then re-oxidizing the reduction products of alumina by electric furnace fusion with bauxite, the bauxite in such proportion that the non-aluminous oxids thereof are in excess of the quantity necessary for the re-oxidation.

4. The process of purifying aluminous materials, which consists in fusing the same in presence of a sufficient proportion of carbon to effect a substantial reduction of the alumina, separating the reduced impurities, and then re-oxidizing the reduction products of alumina by electric furnace fusion with bauxite admixed with carbon, the bauxite in such proportion that the non-aluminous oxids thereof are in excess of the quantity necessary for the re-oxidation, and the carbon in proportion to reduce a part only of the excess of non-aluminous oxids in the bauxite.

In testimony whereof, I affix my signature.

LEWIS E. SAUNDERS.